(12) United States Patent
Huang et al.

(10) Patent No.: US 7,090,366 B2
(45) Date of Patent: Aug. 15, 2006

(54) INSPECTING APPARATUS FOR BACKLIGHT MODULES

(75) Inventors: Chung-Sung Huang, Miao-Li (TW); Jian-Jun Yang, Shenzhen (CN)

(73) Assignee: Innolux Display Corp., Miao-Li (TW)

( * ) Notice: Subject to any disclaimer, the term of this patent is extended or adjusted under 35 U.S.C. 154(b) by 0 days.

(21) Appl. No.: 11/075,152

(22) Filed: Mar. 7, 2005

(65) Prior Publication Data

US 2005/0195388 A1    Sep. 8, 2005

(30) Foreign Application Priority Data

Mar. 5, 2004    (TW)    .............................. 93105802 A

(51) Int. Cl.
*A61G 13/00*    (2006.01)
*G03B 15/02*    (2006.01)
*B23Q 3/00*    (2006.01)

(52) U.S. Cl. ............................ 362/33; 362/11; 362/12; 269/305

(58) Field of Classification Search .................. 362/33, 362/11–12, 249, 97, 608–610, 612, 633, 634, 362/283, 427, 138; 269/305, 11; 324/770; 385/901

See application file for complete search history.

(56) References Cited

U.S. PATENT DOCUMENTS

| | | | | | |
|---|---|---|---|---|---|
| 2,629,924 | A | * | 2/1953 | Kauper | ........................ 269/11 |
| 6,876,211 | B1 | * | 4/2005 | Chung et al. | ................ 324/754 |
| 2002/0171188 | A1 | * | 11/2002 | Sorel et al. | .................... 269/11 |
| 2003/0133304 | A1 | * | 7/2003 | Wallach | ...................... 362/414 |

* cited by examiner

*Primary Examiner*—Renee Luebke
*Assistant Examiner*—Evan Dzierzynski
(74) *Attorney, Agent, or Firm*—Wei Te Chung

(57) ABSTRACT

An inspecting apparatus (4) for inspecting light guide plates and/or backlight modules includes a working table (400), a cover device (480), a light-emitting diode unit (420), a movable electric clip (470), and a holding device (460). The cover device is adjustably set on the working table, and includes a cover (486) and a first light-emitting diode (482) fixed on the cover, the cover is pivotable relative to the working table. The light-emitting diode unit is movable, and includes a second light-emitting diode (422). The movable electric clip has a printed circuit board (471) fixed at one end thereof. The holding device is used for holding a light guide plate or a backlight module on the working table. The inspecting apparatus can be used to inspect light guide plates and/or backlight modules of various different sizes.

12 Claims, 4 Drawing Sheets

INSPECTING APPARATUS FOR BACKLIGHT MODULES

BACKGROUND OF THE INVENTION

1. Field of the Invention

The present invention relates to inspecting apparatuses, and especially to an inspecting apparatus used to inspect a light guide plate (LGP) or a backlight module incorporating an LGP.

2. Description of Prior Art

A process of fabricating a liquid crystal display (LCD) generally comprises forming an LCD panel (known as a "cell process"), and assembling the LCD panel with other parts such as an LGP, optical films, a printed circuit board (PCB), a frame, etc. (known as a "modular process"). In the modular process, the LGP generally needs to be illuminated, so as to inspect the capability of the LGP. Similarly, a backlight module incorporating an LGP also needs to be inspected. In general, the LGP and the backlight module are inspected by using an inspecting apparatus.

Referring to FIG. 4, this shows a top elevation of a first conventional inspecting apparatus 1. The inspecting apparatus 1 is used to hold and inspect an LGP 10. The inspecting apparatus 1 comprises a working table 100, two clamp elements 150, two light-emitting diodes (LEDs) 120, and two switches 130. The two clamp elements 150 are fixed on the working table 100, and are diagonally opposite each other for holding two diagonally opposite corners of the LGP 10. The LEDs 120 are fixed on the working table 100, and are near an incident surface of the LGP 10. The LEDs 120 also connect with a PCB (not shown), so as to be easily fixed on the working table 100 and pass current. The LEDs 120 are controlled by the switches 130 respectively, for illuminating the LGP 10.

Because the LEDs 120 and the clamp elements 150 are fixed on the working table 100, the inspecting apparatus 1 can only hold and inspect one kind of LGP with a specific size. Each time a manufacturer needs to inspect a new LGP with a different size, a new inspecting apparatus 1 must be provided.

Referring to FIG. 5, this shows a top elevation of a second conventional inspecting apparatus 2. The inspecting apparatus 2 is used to hold and inspect a backlight module 20 comprising an LGP 21 and a frame 29. The inspecting apparatus 2 comprises a working table 200, two clamp elements 250, and a cover device 280. The two clamp elements 250 are fixed on the working table 200, and are diagonally opposite each other for holding two diagonally opposite corners of the backlight module 20. The cover device 280 comprises two LEDs 282, a rotatable cover 286, a handle 283, and two shaft bases 284. The LEDs 282 are fixed on the free end of the cover 286. The two shaft bases 284 are fixed on the working table 200. A shaft (not labeled) interconnects a bottom of the cover 286 with the shaft bases 284, so that the cover 286 can pivot about the shaft. The handle 283 is mounted on one side of the cover 286, so as to facilitate rotatation of the cover 286.

In operation, the backlight module 20 is held by the two clamp elements 250. The cover 286 is rotated to a position in which it overlaps an edge portion of the frame 29, with the LEDs 282 being near an incident surface of the LGP 21. The LEDs 120 are then turned on to inspect the backlight module 20.

Referring to FIG. 6, this shows a top elevation of a third conventional inspecting apparatus 3. The inspecting apparatus 3 is used to hold and inspect a backlight module 30.

The backlight module 30 comprises an LGP 31, a frame 39, two LEDs 32, and a flexible printed circuit board (FPC) 38. The inspecting apparatus 3 comprises a working table 300, two clamp elements 350, and a cover device 380. The two clamp elements 350 are fixed on the working table 300, and are diagonally opposite each other for holding two diagonally opposite corners of the backlight module 30. The cover device 380 comprises a connector 382, a rotatable cover 386, a handle 383, and two shaft bases 384. The connector 382 is fixed on the free end of the cover 386. The shaft bases 384 are fixed on the working table 300. A shaft (not labeled) interconnects a bottom of the cover 386 with the shaft bases 384, so that the cover 386 can pivot about the shaft. The handle 383 is mounted on one side of the cover 386, to facilitate rotatation of the cover 386.

In operation, the backlight module 30 is held by the two clamp elements 350. The cover 386 is rotated to a position above the FPC 38, and the connector 382 is connected with circuits of the FPC 38. The LEDs 32 are turned on to inspect the backlight module 30.

Because the cover devices 280, 380 are not adjustable, each of the inspecting apparatuses 2, 3 can only hold and inspect one kind of backlight module with a specific size. Each time a manufacturer needs to inspect a new backlight module with a different size, a new inspecting apparatus 2 or 3 must be provided. Alternatively, an existing inspecting apparatus must be adapted so that it can be used for the new sized backlight module. Either way, it is inevitable that the costs of mass production are unduly inflated.

Thus, a new adaptable inspecting apparatus which overcomes the above-mentioned disadvantages is desired.

SUMMARY OF THE INVENTION

An object of the present invention is to provide an inspecting apparatus that can be used to inspect light guide plates and backlight modules of various different sizes.

According to the present invention, an inspecting apparatus for inspecting light guide plates and/or backlight modules is provided. The inspecting apparatus comprises a working table, a cover device, a light-emitting diode unit, a freely movable clip, and a holding device. The cover device can move on the working table, and comprises a cover and a first light-emitting diode fixed on the cover. The cover is pivotable relative to the working table. The light-emitting diode unit is freely movable, and comprises a second light-emitting diode. The freely movable clip comprises a printed circuit board fixed at one end thereof, the printed circuit board having electrodes. The holding device is used to hold a light guide plate or a backlight module on the working table.

Other objects, advantages, and novel features of the present invention will become more apparent from the following detailed description when taken in conjunction with the accompanying drawings, in which:

DETAILED DESCRIPTION OF THE EMBODIMENT

Reference will now be made to the drawings to describe the present invention in detail.

Figure 1:
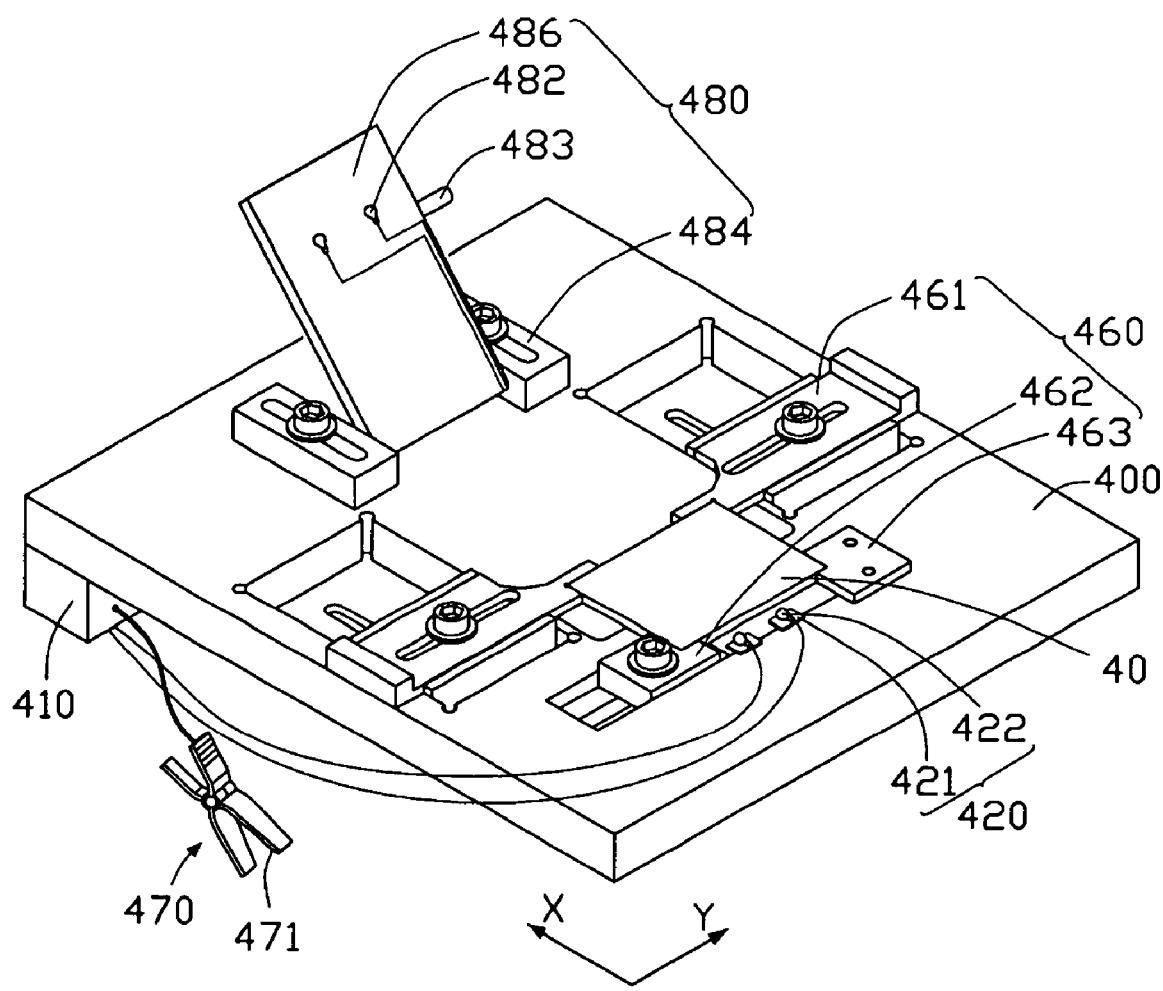
FIG. 1 is an isometric view of an inspecting apparatus according to the present invention, showing a light guide plate held on the inspecting apparatus.

Referring to FIG. 1, this shows an isometric view of an inspecting apparatus 4 according to an embodiment of the present invention. The inspecting apparatus 4 is used to hold and inspect an LGP 40. The inspecting apparatus 4 comprises a working table 400, a cover device 480, two movable LED units 420, a movable electric clip 470, and a clamp device 460.

The working table 400 comprises a power supply 410 under one end thereof. The cover device 480 comprises two LEDs 482, a rotatable cover 486, two slidable shaft bases 484, and a handle 483. The two LEDs 482 are fixed on the rotatable cover 486. The slidable shaft bases 484 are movably located on the working table 400, and can be fixed in desired positions on the working table 400 by two screws respectively. A shaft (not visible) interconnects the slidable shaft bases 484, and the rotatable cover 486 pivots about the shaft. The handle 483 is mounted on one side of the rotatable cover 486, so as to facilitate manual rotation of the rotatable cover 486., The two slidable shaft bases 484 can move the rotatable cover 486 along a linear direction X.

The clamp device 460 comprises two X-Y adjustable clamp blocks 461, a slidable clamp block 462, and a fixed clamp block 463. Each of the two X-Y adjustable clamp blocks 461, the slidable clamp block 462, and the fixed clamp block 463 has a claw portion (not labeled). The four claw portions surround and hold the LGP 40 therebetween. The space surrounded by the four claw portions is adjustable, so that a new LGP with a different size can be held in the clamp device 460.

The movable electric clip 470 comprises a PCB 471 at one end thereof which is used to pass current. Each of the two movable LED units 420 comprises a PCB 421, and an LED 422 positioned on the PCB 421. The LEDs 422, 482 and the movable electric clip 470 connect with the power supply 410 through respective wires. In addition, the switching on and off of the LEDs 422, 482 and the movable electric clip 470 can be controlled by respective switches (not shown).

In operation, when the LGP 40 with a particular size needs to be inspected by the inspecting apparatus 4, an operator can operate the inspecting apparatus 4 as follows. Firstly, the slidable clamp block 462 is adjusted along the Y direction, and the two X-Y adjustable clamp blocks 461 are adjusted along the X and/or Y directions, such that the clamp device 460 holds the LGP 40. Secondly, the LED units 420 are positioned near an incident surface of the LGP 40, and the LED units 420 are fixed on the working table 400 with adhesive. Finally, the LEDs 422 are turned on to inspect the capability of the LGP 40. Notably, the cover device 480 and the electric clip 470 are not used in this inspecting process.

Figure 2:
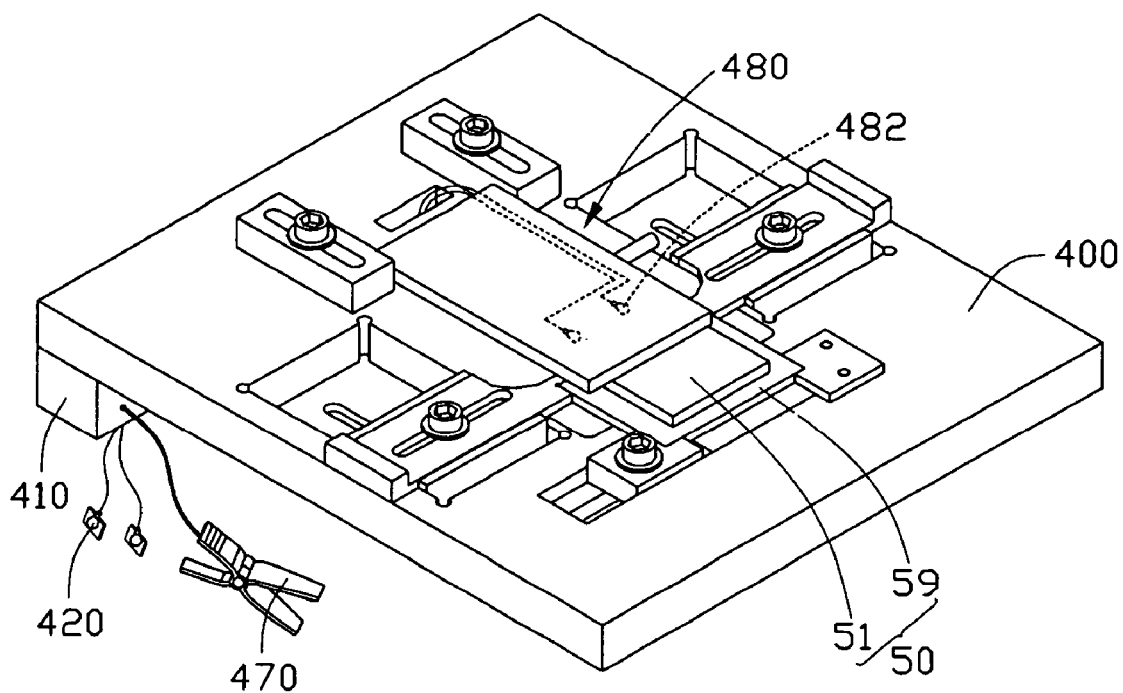
FIG. 2 is similar to FIG. 1, but showing the inspecting apparatus holding a backlight module without a flexible printed circuit.

Referring to FIG. 2, this shows the inspecting apparatus 4 being used to hold and inspect a backlight module 50 without an FPC. The backlight module 50 comprises an LGP 51 and a frame 59. The inspecting apparatus 4 can be operated as follows. Firstly, the slidable clamp block 462 and the two X-Y adjustable clamp blocks 461 are adjusted, so that the clamp device 460 holds the backlight module 50. Secondly, the two slidable shaft bases 484 are slid to and fixed at appropriate locations, such that when the rotatable cover 486 is rotated down onto the working table 400, the rotatable cover 486 overlaps an edge portion of the frame 59, and the LEDs 482 are located near an incident surface of the LGP 51. Finally, the LEDs 482 are turned on to inspect the capability of the backlight module 50. Notably, the LED units 420 and the electric clip 470 are not used in this inspecting process.

Figure 3:
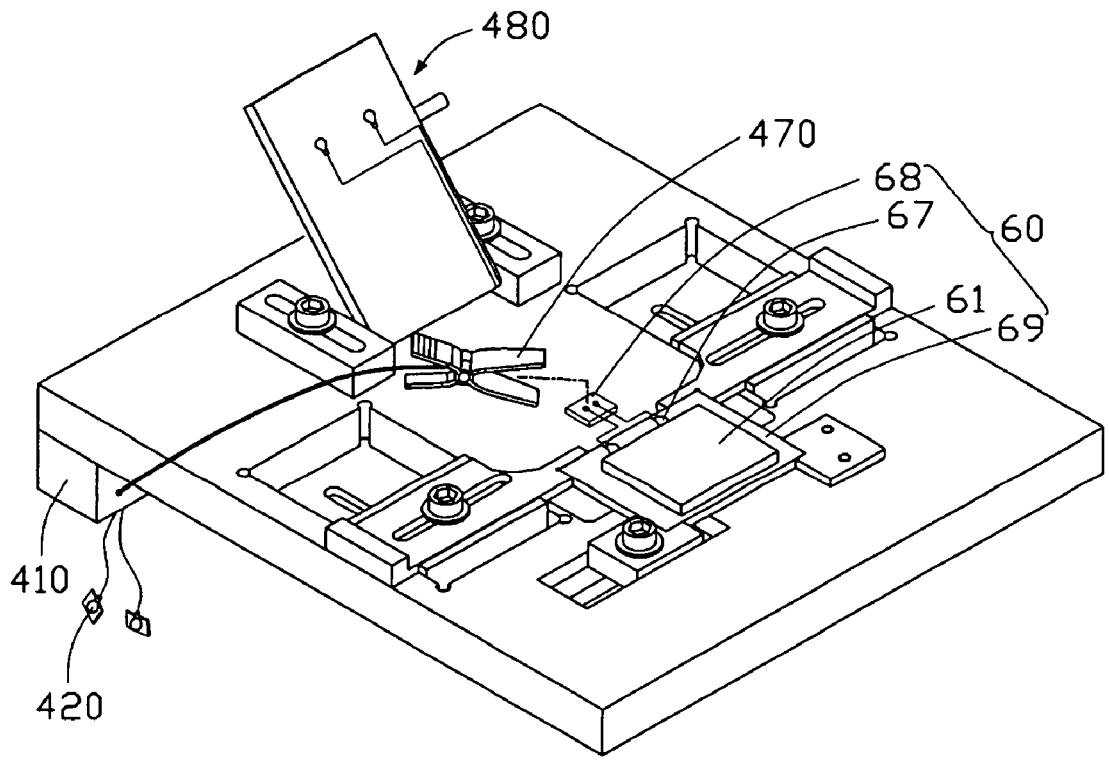
FIG. 3 is similar to FIG. 1, but showing the inspecting apparatus holding a backlight module with a flexible printed circuit.
Figure 4:
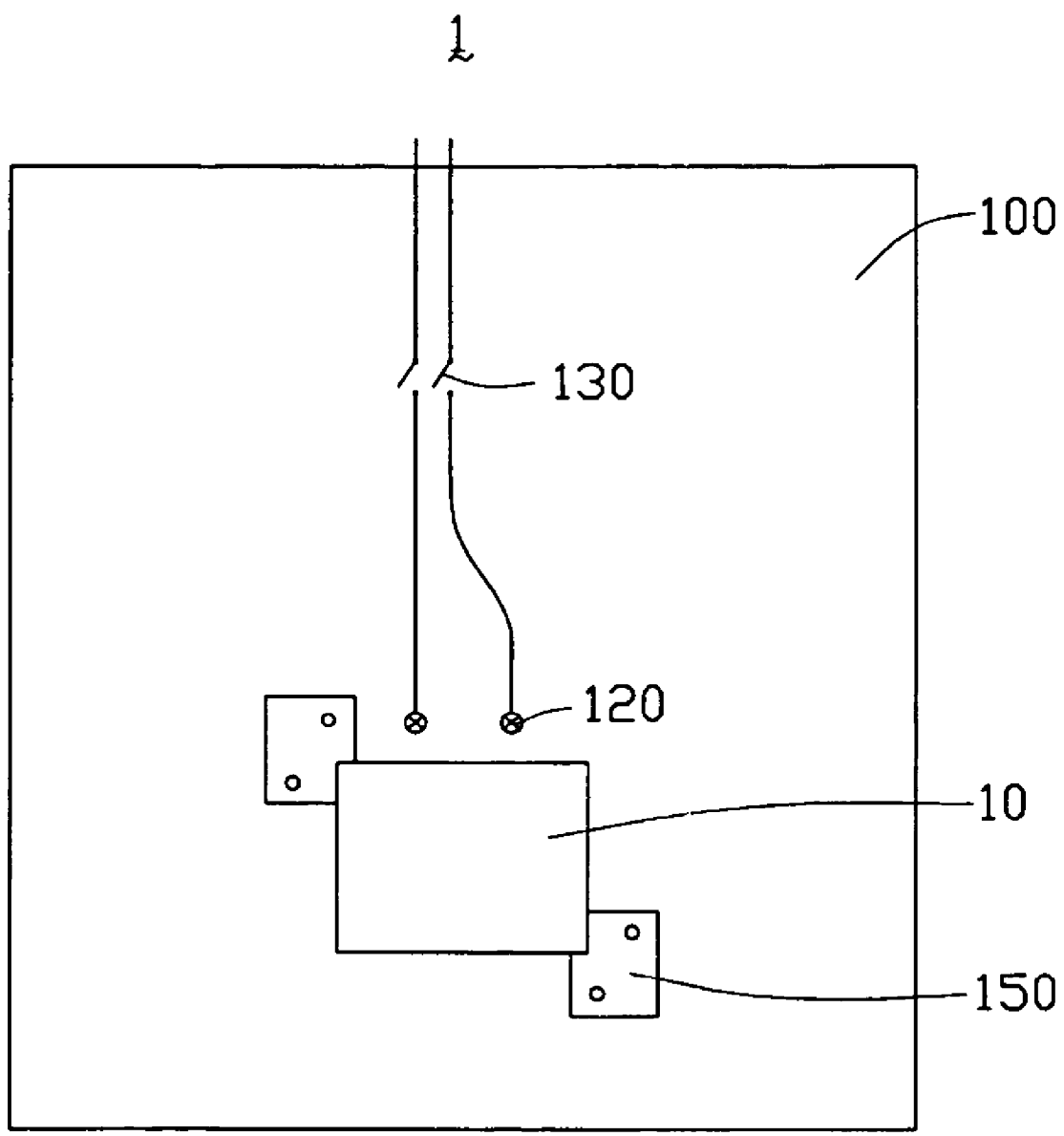
FIG. 4 is a top elevation of a first conventional inspecting apparatus, showing a light guide plate held on the inspecting apparatus.
Figure 5:
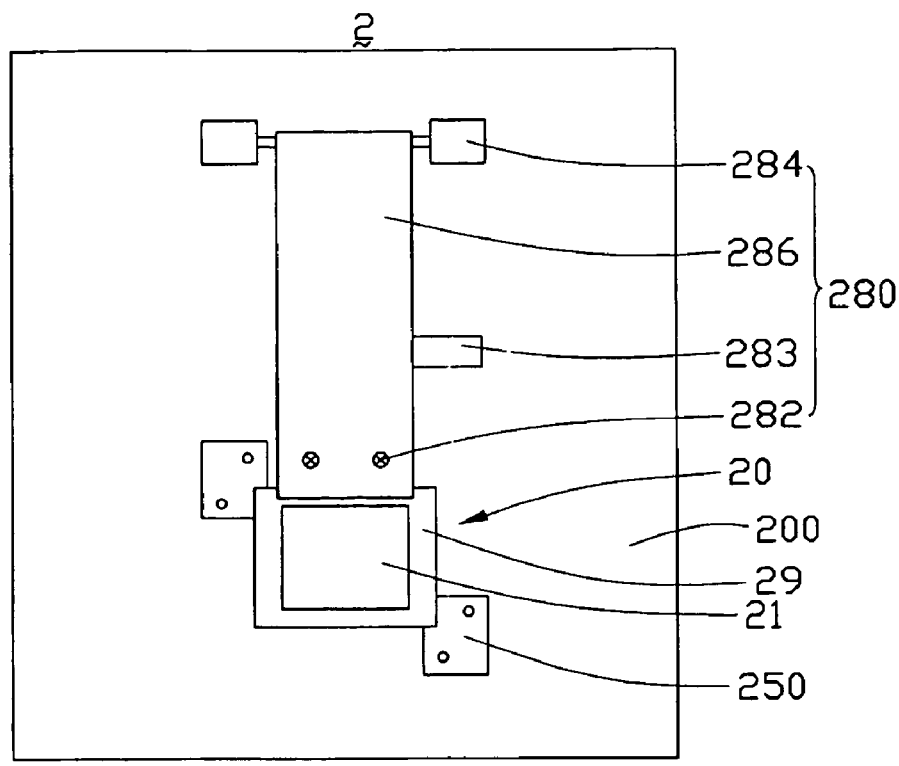
FIG. 5 is a top elevation of a second conventional inspecting apparatus, showing a backlight module without a flexible printed circuit held on the inspecting apparatus.
Figure 6:
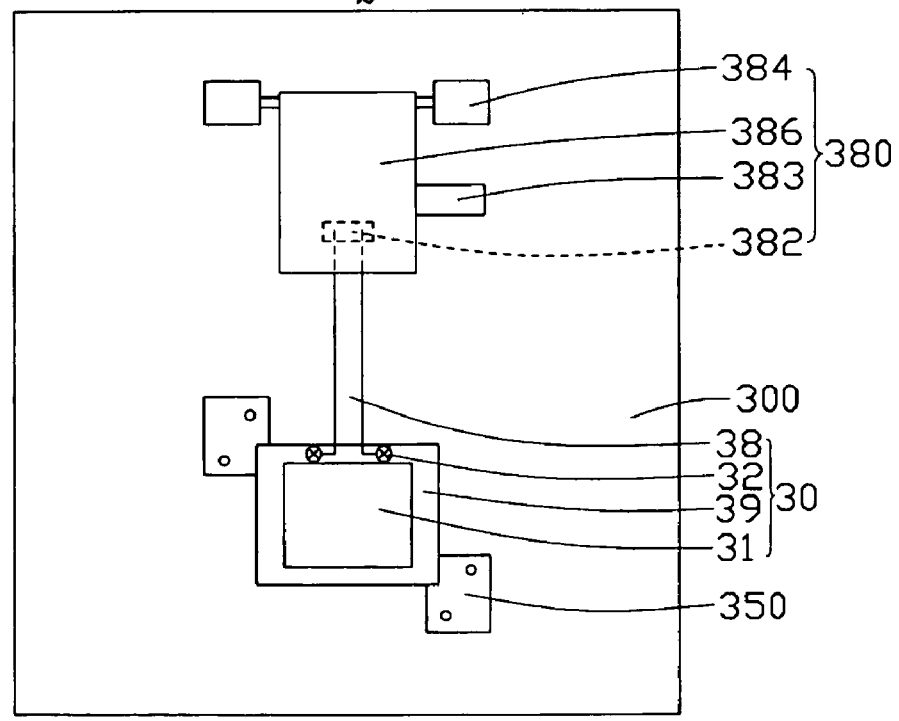
FIG. 6 is a top elevation of a third conventional inspecting apparatus, showing a backlight module with a flexible printed circuit held on the inspecting apparatus.

Referring to FIG. 3, this shows the inspecting apparatus 4 being used to hold and inspect a backlight module 60 with an FPC 68. The backlight module 60 comprises an LGP 61, a frame 69, two LEDs 67, and the FPC 68. The FPC 68 connects with the two LEDs 67, and extends out of the main parts of the backlight module 60. The inspecting apparatus 4 can be operated as follows. Firstly, the slidable clamp block 462 and the two X-Y adjustable clamp blocks 461 are adjusted, so that the clamp device 460 holds the backlight module 60. Secondly, the extending end of the FPC 68 is clipped by the electric clip 470, so that electrodes of the PCB 471 and the FPC 68 are connected. Finally, current is applied to the LEDs 67 by the power supply 410, to inspect the capability of the backlight module 60. Notably, the LED units 420 and the cover device 480 are not used in this inspecting process.

Because the inspecting apparatus 4 of present invention has the adjustable clamp device 460, the space surrounded by the claw portions of the clamp device 460 can be readily adjusted. Thus, LGPs and backlight modules with different sizes can be conveniently held on the same inspecting apparatus 4 as needed. The movable LED units 420, the movable electric clip 470, and the slidable cover device 480 can satisfy the different needs for inspecting different kinds of LGPs and backlight modules.

In alternative embodiments, the clamp device 460 can be replaced by a plurality of suction holes defined in the working table, the suction holes communicate with a vacuum pump. The power supply 410 can be omitted, with power being obtained from an external power source.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An inspecting apparatus for inspecting light guide plates and/or backlight modules, comprising:
   a working table;
   a cover device adjustably set on the working table, the cover device comprising a cover and a first light-emitting diode fixed on the cover, the cover being pivotable relative to the working table;
   a movable light-emitting diode unit comprising a second light-emitting diode;
   a movable electric clip having a printed circuit board fixed at one end thereof; and
   a holding device for holding a light guide plate or a backlight module on the working table.

2. The inspecting apparatus as recited in claim 1, wherein the cover device further comprises a shaft and two slidable shaft bases, the two slidable shaft bases being adjustably located on the working table, the shaft interconnecting the cover with the two slidable shaft bases, the cover being pivotable about the shaft.

3. The inspecting apparatus as recited in claim 1, wherein the working table comprises a power supply connecting with the first light-emitting diode, the second light-emitting diode, and the electric clip through wires, respectively.

4. The inspecting apparatus as recited in claim 3, wherein the working table comprises a plurality of switches used to control the switching on and off of the first light-emitting diode, the second light-emitting diode, and the electric clip, respectively.

5. The inspecting apparatus as recited in claim 1, wherein the cover device further comprises a handle mounted on one side of the cover.

6. The inspecting apparatus as recited in claim 1, wherein the holding device comprises two X-Y adjustable clamps, a slidable clamp, and a fixed clamp, one of the X-Y adjustable clamps and the fixed clamp being diagonally opposite each other, the slidable clamp and the other one of the X-Y adjustable clamps being diagonally opposite each other.

7. The inspecting apparatus as recited in claim 1, wherein the working table defines a plurality of suction holes, the suction holes communicating with a vacuum pump.

8. The inspecting apparatus as recited in claim 1, wherein the movable light-emitting diode unit further comprises a printed circuit board, and the second light-emitting diode is fixed on the printed circuit board.

9. An inspecting apparatus assembly comprising:
   a working table;
   a cover device adjustably set on the working table, the cover device comprising a cover, the cover being pivotable relative to the working table;
   a movable electric clip having a printed circuit board fixed at one end thereof; and
   a holding device for holding a light guide plate or a backlight module on the working table; wherein
   a flexible printed circuit formed on an inspected backlight module, is electrically connected and engaged with the printed circuit board.

10. The assembly as recited in claim 9, wherein said cover device includes a first diode fixed on the cover.

11. The assembly as recited in claim 10, further including a movable light-emitting diode unit comprising a second light-emitting diode.

12. The assembly as recited in claim 9, wherein said inspected backlight module occupies a position on the working table, which is different from that of another backlight module having a different size therefrom.

* * * * *